United States Patent
Harrebek et al.

(10) Patent No.: US 12,451,924 B2
(45) Date of Patent: Oct. 21, 2025

(54) FULL DUPLEX

(71) Applicant: NOKIA TECHNOLOGIES OY, Espoo (FI)

(72) Inventors: Johannes Harrebek, Aalborg (DK); Benny Vejlgaard, Gistrup (DK); Simon Svendsen, Aalborg (DK); Christian Rom, Aalborg (DK)

(73) Assignee: NOKIA TECHNOLOGIES OY, Espoo (FI)

( * ) Notice: Subject to any disclaimer, the term of this patent is extended or adjusted under 35 U.S.C. 154(b) by 369 days.

(21) Appl. No.: 17/995,467

(22) PCT Filed: Mar. 30, 2021

(86) PCT No.: PCT/EP2021/058321
§ 371 (c)(1),
(2) Date: Oct. 4, 2022

(87) PCT Pub. No.: WO2021/204601
PCT Pub. Date: Oct. 14, 2021

(65) Prior Publication Data
US 2023/0132552 A1  May 4, 2023

(30) Foreign Application Priority Data
Apr. 6, 2020  (FI) .................................... 20205363

(51) Int. Cl.
*H04B 1/44* (2006.01)
*H04B 1/52* (2015.01)
*H04B 1/56* (2006.01)

(52) U.S. Cl.
CPC ................. *H04B 1/56* (2013.01); *H04B 1/52* (2013.01)

(58) Field of Classification Search
CPC .......... H04B 1/56; H04B 1/52; H04B 1/0057; H04B 1/006; H04B 1/0064; H04B 1/38; H04B 1/40; H04B 7/0602
See application file for complete search history.

(56) References Cited

U.S. PATENT DOCUMENTS

| | | | |
|---|---|---|---|
| 8,610,543 B2 * | 12/2013 | Alicot ...................... | H04B 1/10 370/279 |
| 10,778,290 B2 * | 9/2020 | Leung ...................... | H04B 1/04 |

(Continued)

FOREIGN PATENT DOCUMENTS

| | | |
|---|---|---|
| CN | 102036430 A | 4/2011 |
| CN | 104798310 A | 7/2015 |

(Continued)

OTHER PUBLICATIONS

Berardinelli et al., "Evaluating Full Duplex Potential in Dense Small Cells from Channel Measurements", 2016 IEEE 83rd Vehicular Technology Conference (VTC Spring), (May 15-18, 2016), 5 pages.

(Continued)

*Primary Examiner* — Tuan Pham
(74) *Attorney, Agent, or Firm* — ALSTON & BIRD LLP

(57) ABSTRACT

An apparatus comprising: radio frequency paths for antenna elements of an array of antenna elements; and means for: determining which of a first group of radio frequency paths are transmission radio frequency paths to be used for transmission and which of a second group of radio frequency paths are reception radio frequency paths to be used for reception; and controlling when to use the determined transmission radio frequency paths for transmission and the determined reception radio frequency paths for reception.

19 Claims, 8 Drawing Sheets

(56) References Cited

U.S. PATENT DOCUMENTS

| | | | |
|---|---|---|---|
| 11,088,452 B2* | 8/2021 | Avser | H01Q 1/24 |
| 2009/0213765 A1 | 8/2009 | Rinne et al. | |
| 2011/0075593 A1 | 3/2011 | Chen et al. | |
| 2014/0050124 A1 | 2/2014 | Yang et al. | |
| 2015/0268336 A1* | 9/2015 | Yukumatsu | G01S 13/04 |
| | | | 342/175 |
| 2017/0187099 A1 | 6/2017 | Patel et al. | |
| 2019/0238174 A1 | 8/2019 | Bengtsson | |
| 2019/0319649 A1 | 10/2019 | Malik et al. | |
| 2020/0028261 A1 | 1/2020 | Foo | |
| 2020/0411981 A1* | 12/2020 | Kimball | H04B 1/44 |

FOREIGN PATENT DOCUMENTS

| | | | |
|---|---|---|---|
| EP | 3716521 A1 | 9/2020 | |
| WO | WO 2016/005797 A1 | 1/2016 | |
| WO | 2019/158207 A1 | 8/2019 | |
| WO | WO 2020/221432 A1 | 11/2020 | |

OTHER PUBLICATIONS

Cummings et al., "Aperture-Level Simultaneous Transmit and Receive With Digital Phased Arrays", IEEE Transactions on Signal Processing, vol. 68, (Jan. 22, 2020), 16 pages.

Doane et al., "Simultaneous Transmit and Receive Performance of an 8-Channel Digital Phased Array", 2017 IEEE International Symposium on Antennas and Propagation & USNC/URSI National Radio Science Meeting, (Oct. 19, 2017), 2 pages.

Huawei, "New WID on NR Uu Interface Enhancement", 3GPP TSG RAN Meeting #78, RP-172483, (Dec. 18-21, 2017), 5 pages.

International Search Report and Written Opinion for Patent Cooperation Treaty Application No. PCT/EP2021/058321 dated Aug. 27, 2021, 17 pages.

LG Electronics et al., "New SI Proposal: Study on Flexible and Full Duplex for Nr", 3GPP TSG RAN Meeting #78, RP-172636, (Dec. 18-21, 2017), 5 pages.

Mahmood et al., "On the Potential of Full Duplex Communication in 5G Small Cell Networks", 2015 IEEE 81st Vehicular Technology Conference (VTC Spring), (Jul. 2, 2015), 5 pages.

Mahmood et al., "Throughput Analysis of Full Duplex Communication with Asymmetric Traffic in Small Cell Systems", The Eleventh International Conference on Wireless and Mobile Communications, (Oct. 2015), 4 pages.

Office Action for Finland Application No. 20205363 dated Aug. 3, 2021, 1 page.

Office Action for Finland Application No. 20205363 dated Oct. 30, 2020, 10 pages.

Sarret et al., "Analyzing the Potential of Full Duplex in 5G Ultra-Dense Small Cell Networks", EURASIP Journal on Wireless Communications and Networking, (Dec. 2016), 17 pages.

Sarret et al., "Impact of Transport Control Protocol on Full Duplex Performance in 5G Networks", 2016 IEEE 83rd Vehicular Technology Conference (VTC Spring), (Jul. 7, 2016), 5 pages.

Office Action for Chinese Application No. 202180040796.1 dated Mar. 31, 2025, 15 pages.

Office Action for Chinese Application No. 202180040796.1 dated Aug. 26, 2025, 18 pages.

Office Action for European Application No. 21716163.7 dated Jul. 28, 2025, 5 pages.

* cited by examiner

FULL DUPLEX

CROSS-REFERENCE TO RELATED APPLICATIONS

This application is a national phase entry of International Application No. PCT/EP2021/058321, filed Mar. 30, 2021, which claims priority to Finnish Application No. 20205363, filed Apr. 6, 2020, the contents of which are hereby incorporated by reference in their entirety.

TECHNOLOGICAL FIELD

Embodiments of the present disclosure relate to controlling full duplex communication.

BACKGROUND

Full duplex (FD) operation occurs when a radio transceiver simultaneously transmits and receives radio waves with overlapping frequencies. The transmission path leaks energy to the reception path causing self-interference and a transmitted signal can generate interference in a received signal.

A Physical Resource Block (PRB) is the smallest time-frequency tile that can be allocated as a resource for a radio transceiver. For example, in an orthogonal frequency division (OFDM) implementation, a PRB can be defined as consisting of a fixed number of consecutive subcarriers for one time slot. For example, 12 consecutive subcarriers for one time slot of duration 0.5 ms. Full duplex operation occurs when a radio transceiver simultaneously transmits and receives radio waves in the same PRB.

It would be desirable to reduce or control self-interference during full duplex operation of a transceiver.

BRIEF SUMMARY

According to various, but not necessarily all, embodiments there is provided an apparatus comprising:
radio frequency paths for antenna elements of an array of antenna elements; and means for:
determining which of a first group of radio frequency paths are transmission radio frequency paths to be used for transmission and which of a second group of radio frequency paths are reception radio frequency paths to be used for reception; and
controlling when to use the determined transmission radio frequency paths for transmission and the determined reception radio frequency paths for reception.

In some but not necessarily all examples, the array of antenna elements is a one or two-dimensional array of antenna elements that is positioned on a single surface or a single edge of the apparatus.

In some but not necessarily all examples, the apparatus comprises control means for enabling full duplex operation of the apparatus comprising simultaneously using the determined transmission radio frequency paths for transmission in at least a first frequency range and the determined reception radio frequency paths for reception in at least the first frequency range.

In some but not necessarily all examples, the apparatus comprises means for switching between a time division duplex mode of operation in which radio frequency paths are not used simultaneously for transmission and reception and a full duplex mode of operation in which there is simultaneous use of the determined transmission radio frequency paths for transmission in at least a first frequency range and the determined reception radio frequency paths for reception in at least the first frequency range.

In some but not necessarily all examples, each of at least a first plurality of the antenna elements have a pair of parallel radio frequency paths comprising one radio frequency path for transmission and another radio frequency path for reception.

In some but not necessarily all examples, the apparatus comprises at least one first switching means for selecting one or more of the radio frequency paths for transmission to be used as transmission radio frequency paths and at least one second switching means for selecting one or more of the radio frequency paths for reception to be used as reception radio frequency paths.

In some but not necessarily all examples, each radio frequency path for transmission and each radio frequency path for reception has a separate phase shifter.

In some but not necessarily all examples, the first group of radio frequency paths provides a single radio frequency path, for transmission, to each antenna element in a first sub-set of the antenna elements and wherein the second group of radio frequency paths provides a single radio frequency path, for reception, to each antenna element in a second sub-set of the antenna elements, wherein the first sub-set and the second sub-set fully or partially overlap.

In some but not necessarily all examples, the first group of radio frequency paths provides a single radio frequency path, for transmission, to each antenna element in a first sub-set of the antenna elements and wherein the second group of radio frequency paths provides a single radio frequency path, for reception, to each antenna element in a second sub-set of the antenna elements, wherein the first sub-set and the second sub-set do not overlap.

In some but not necessarily all examples, the apparatus comprises control means for controlling the radio frequency paths to each antenna element such that each antenna element is configured to transmit, configured to receive or configured for non-use.

In some but not necessarily all examples, the control means for controlling the radio frequency paths to each antenna element comprises means for terminating at least one radio frequency path for reception at a known state.

In some but not necessarily all examples, the termination of the at least one radio frequency path for reception path to a known state is either a direct termination, an indirect termination via a phase shifter, or an indirect termination via a serially connected phase shifter and amplifier.

In some but not necessarily all examples, the apparatus comprises control means for controlling phase shifts in at least some of the radio frequency paths for antenna elements; control means for optimizing phase shifts in the transmission radio frequency paths to optimize isolation of the reception radio frequency paths; and control means for optimizing phase shifts in the reception radio frequency paths to optimize a combined isolation of the reception radio frequency paths.

In some but not necessarily all examples, the apparatus comprises control means for controlling phase shifts in at least some of the radio frequency paths for antenna elements to achieve a preferred beam forming direction; control means for optimizing phase shifts in the transmission radio frequency paths to optimize isolation of the reception radio frequency paths; and control means for optimizing phase shifts in the reception radio frequency paths to optimize a combined isolation of the reception radio frequency paths.

In some but not necessarily all examples, the apparatus is a portable electronic device.

In some but not necessarily all examples, there is provided a system comprising a network node and at least one apparatus, wherein the apparatus is a mobile equipment, wherein transmission is uplink transmission to the network node and reception is downlink reception from the network node, wherein the apparatus and the network node have a relative position defined by a beam steering angle, wherein the system is configured to enable communication between the network node and the apparatus to be used in the determination of the transmission radio frequency paths and the reception radio frequency paths and/or controlling when to use the determined transmission radio frequency paths for transmission and the determined reception radio frequency paths for reception.

In some but not necessarily all examples, the communication between the network node and the apparatus is used to determine a maximum uplink power for the beam steering angle, wherein the maximum uplink power, for a given beam steering angle is dependent upon a beam steering angle-dependent isolation function, gain loss at the mobile equipment, and a downlink sensitivity limit.

In some but not necessarily all examples, there is provided a method comprising:
  determining which of a first group of radio frequency paths for antenna elements of an array of antenna elements are transmission radio frequency paths to be used for transmission and which of a second group of radio frequency paths are reception radio frequency paths to be used for reception; and
  controlling when to use the determined transmission radio frequency paths for transmission and the determined reception radio frequency paths for reception.

In some but not necessarily all examples, there is provided a computer program that, when run on a computer, performs:
  determining which of a first group of radio frequency paths for antenna elements of an array of antenna elements are transmission radio frequency paths to be used for transmission and which of a second group of radio frequency paths are reception radio frequency paths to be used for reception; and
  controlling when to use the determined transmission radio frequency paths for transmission and the determined reception radio frequency paths for reception.

According to various, but not necessarily all, embodiments there is provided examples as claimed in the appended claims.

BRIEF DESCRIPTION

Some examples will now be described with reference to the accompanying drawings in which.

DETAILED DESCRIPTION

Figure 1:
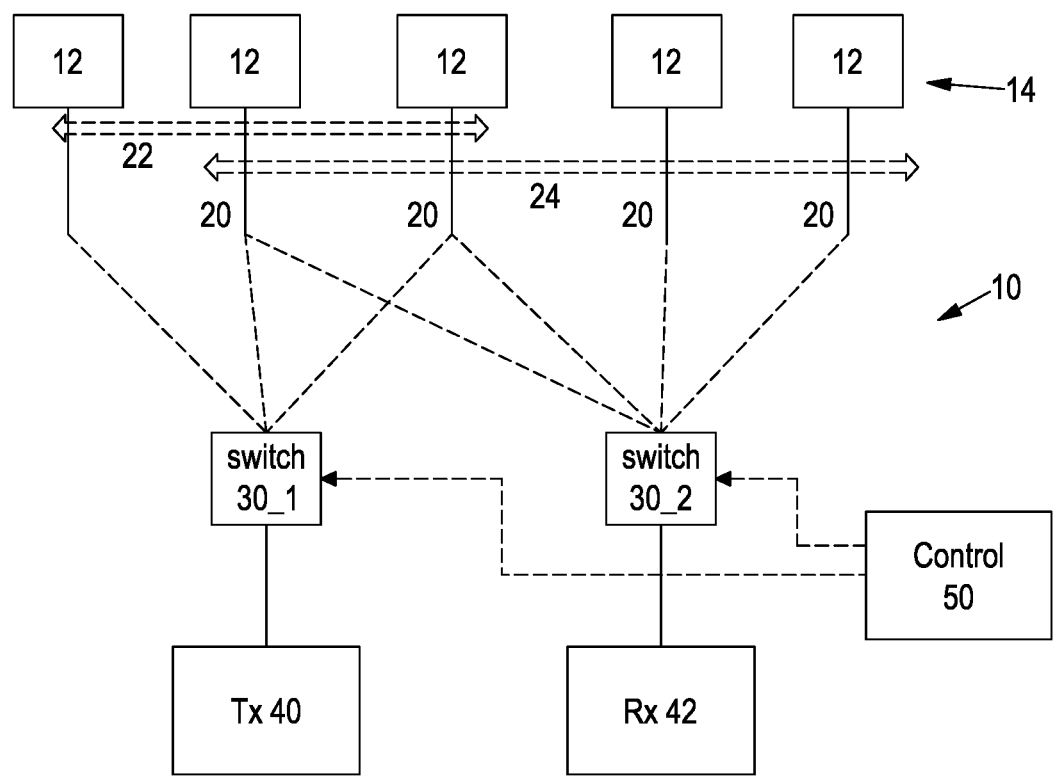
FIG. 1 shows an example of the subject matter described herein.

Reference will be made in the FIGs and the following examples to an apparatus 10 comprising:
  radio frequency paths 20 for antenna elements 12 of an array 14 of antenna elements 12; and means 50 for: determining which of a first group 22 of radio frequency paths 20 are transmission radio frequency paths 20 to be used for transmission and which of a second group 24 of radio frequency paths 20 are reception radio frequency paths 20 to be used for reception; and controlling when to use the determined transmission radio frequency paths 20 for transmission and the determined reception radio frequency paths 20 for reception.

The apparatus 10 enables a flexible operation. The apparatus 10 can operate in full duplex mode. The full duplex mode can also be flexible, in at least some examples, if required. The size of the allocated time-frequency tile used for full duplex can, in at least some examples be controlled. For example, the duration of the time-frequency tile used for full duplex can be controlled and/or the frequency range of the time-frequency tile used for full duplex can be controlled.

The apparatus 10 can in some examples, flexibly operate in modes other than or in addition to full duplex, for example, time division duplex (TDD) mode and/or frequency division duplex (FDD) mode.

The apparatus 10 by selection of which of the first group 22 of radio frequency paths 20 are transmission radio frequency paths 20 and which of the second group 24 of radio frequency paths 20 are reception radio frequency paths 20 during full duplex operation (simultaneous use, at overlapping frequency ranges, for transmission and reception), controls isolation between the reception radio frequency paths 20 to transmitter 40 and the transmission radio frequency paths 20 to receiver 42.

In some examples, the reception radio frequency paths 20 are physically separated from transmission radio frequency paths 20 by one or more radio frequency paths 20 that are not in use for transmission or reception.

The apparatus 10 can, in some examples, flexibly switch into or out of the full duplex mode of operation. In some examples, the switch 30 can be dependent upon a reception quality parameter measured at the apparatus 10.

FIG. 1 illustrates an example of the apparatus 10.

The apparatus 10 comprises radio frequency paths 20 for antenna elements 12 of an array 14 of antenna elements 12.

A first group 22 of radio frequency paths 20 are suitable for use as transmission radio frequency paths in that each path 20 is capable of interconnecting a respective antenna element 12 with a transmitter 40. When a radio frequency path 20 is interconnected to the transmitter 40 it is referred to as a transmission radio frequency path 20 rather than a radio frequency path 20.

A second group 24 of radio frequency paths 20 are suitable for use as reception radio frequency paths in that each path 20 is capable of interconnecting a respective antenna element 12 with a receiver 42. When a radio frequency path 20 is interconnected to the receiver 42 it is referred to as a reception radio frequency path 20 rather than a radio frequency path 20.

Each antenna element 12 cannot be simultaneously connected to both the transmitter 40 and the receiver 42. That is a radio frequency path 20 cannot be simultaneously both a reception radio frequency path 20 and a transmission radio frequency path 20.

In this example, at least some of the antenna elements 12 can operate as a reception radio frequency path 20 or a transmission radio frequency path 20. Switches 30 can be used to control whether a particular antenna element 12 operates as a reception radio frequency path 20 or a transmission radio frequency path 20.

The apparatus comprises a controller 50 configured to determine which of the first group 22 of radio frequency paths 20 are transmission radio frequency paths 20 to be used for transmission and which of a second group 24 of radio frequency paths 20 are reception radio frequency paths 20 to be used for reception. In the example illustrated the controller 50 provides control signals to the switches 30 which select whether a particular antenna element 12 operates as a reception radio frequency path 20 or a transmission radio frequency path 20.

As will be described later it is also possible for the controller 50 to provide control signals to the switches 30 which select whether a particular antenna element 12 operates as a reception radio frequency path 20, a transmission radio frequency path 20 or is not used.

The apparatus controller 50 is also configured to control when to use the determined transmission radio frequency paths 20 for transmission and the determined reception radio frequency paths 20 for reception. This can, for example, be controlled by the timing of the control signals.

The controller 50 can be implemented in many ways as will be described later.

In this example, each of a first plurality of the antenna elements 12 have a pair of parallel radio frequency paths 20 comprising one radio frequency path 20 for transmission and another radio frequency path 20 for reception. A first switching means 30_1 is configured to select, under control of the controller 50, the radio frequency path 20 for transmission to be used as a transmission radio frequency path 20. A second switching means 30_2 is configured to select, under control of the controller 50, the radio frequency path 20 for reception to be used as a reception radio frequency path 20.

The illustrated apparatus 10 therefore comprises:
radio frequency paths 20 for antenna elements 12 of an array 14 of antenna elements 12; and means 50 for: determining which of a first group 22 of radio frequency paths 20 are transmission radio frequency paths 20 to be used for transmission and which of a second group 24 of radio frequency paths 20 are reception radio frequency paths 20 to be used for reception; and controlling when to use the determined transmission radio frequency paths 20 for transmission and the determined reception radio frequency paths 20 for reception.

The apparatus 10 enables a flexible operation. The apparatus 10 can operate in full duplex mode-simultaneous transmission and reception using overlapping frequency ranges. The full duplex mode is also flexible, if required. The size of the allocated time-frequency tile used for full duplex can, in at least some examples be controlled. For example, the duration of the time-frequency tile used for full duplex can be controlled and/or the frequency range of the time-frequency tile used for full duplex can be controlled.

The apparatus by selection of which of the first group 22 of radio frequency paths 20 are transmission radio frequency paths 20 and which of the second group of radio frequency paths 20 are reception radio frequency paths 20 during full duplex operation (simultaneous use, at overlapping frequency ranges, for transmission and reception) controls isolation between the reception radio frequency paths 20 to receiver 42 and the transmission radio frequency paths 20 to transmitter 40.

In the example illustrated, the array 14 of antenna elements 12 is illustrated as a one dimensional array. However, the array can for example have other arrangements. It may, for example, be a two-dimensional array 14.

It should be appreciated that in some examples the transmitter 40 can be configured to send the same information for transmission via each transmission radio frequency path 20. In other examples, the transmitter 40 can be configured to send different information for transmission via different ones or groups of transmission radio frequency paths 20.

It should be appreciated that in some examples the receiver 42 can be configured to receive the same information via each reception radio frequency path 20. In other examples, the receiver 42 can be configured to receive the different information via different ones or groups of reception radio frequency paths 20.

Figure 2A:
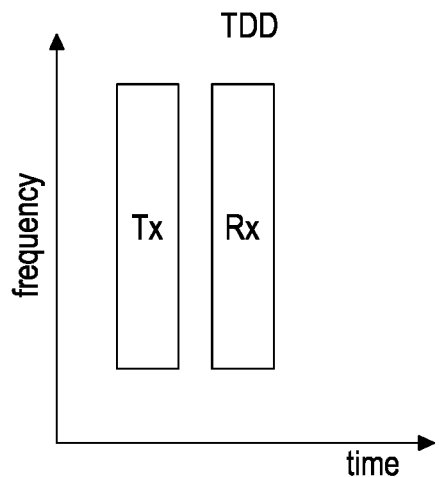
FIG. 2A, 2B, 2C, 2D show examples of the subject matter described herein.
Figure 2B:
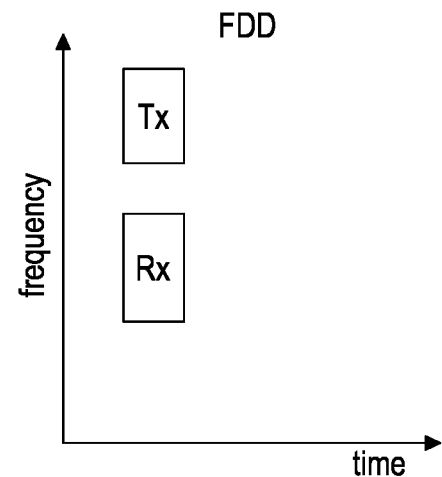
Figure 2C:
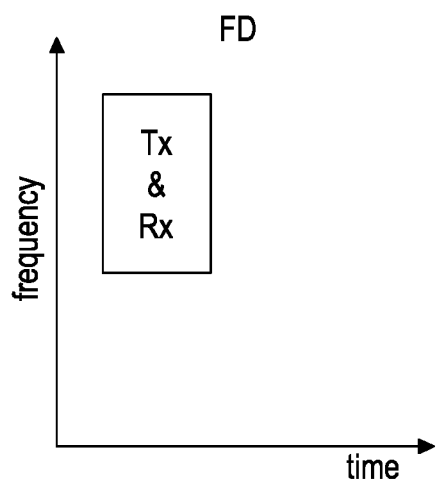
Figure 2D:
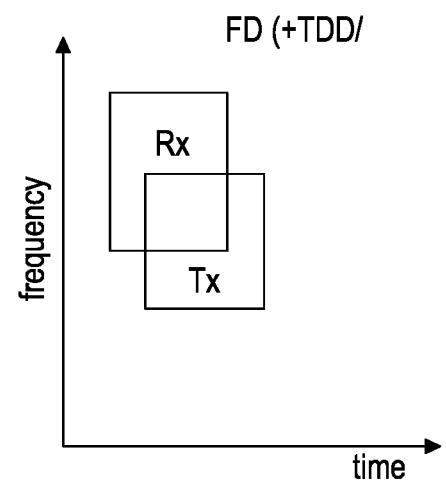

FIG. 2A illustrates an example of a time division duplex mode of operation. FIG. 2B illustrates an example of a frequency division duplex mode of operation. FIG. 2C illustrates an example of a full duplex mode of operation. FIG. 2D illustrates another example of a full duplex mode of operation.

FIG. 2A illustrates an example of a time division duplex (TDD) mode of operation.

The transmission allocation (transmission time-frequency tile Tx) and the reception allocation (reception time-frequency tile Tx), are separated—they are separated in time (no overlap) and overlap in frequency. In this example, the overlap in frequency is exact. No frequency-time slots (PRB) are shared for transmission and reception. All antenna elements 12 can be used for transmission. All antenna elements can be used for reception. There is no need to divide the antenna elements 12 between transmission and reception.

In some but not necessarily all examples, the apparatus 10 can implement the TDD mode by using determined radio frequency paths 20 of the first group 22 of radio frequency paths 20 for transmission at a first time and using determined radio frequency paths 20 of the second group 24 of radio frequency paths 20 for reception at a second time different to the first time. The first group 22 of radio frequency paths 20 for transmission and the second group 24 of radio frequency paths 20 for reception can fully overlap in frequency in this TDD mode.

FIG. 2B illustrates an example of a frequency division duplex (FDD) mode of operation. The transmission allocation (transmission time-frequency tile Tx) and the reception allocation (reception time-frequency tile Rx) are separated—they are separated in frequency (no overlap) and overlap in time. In this example, the overlap in time is exact. No frequency-time slots (PRB) are shared for transmission and reception.

In some but not necessarily all examples, the apparatus 10 can implement a FDD mode by using determined radio frequency paths 20 of the first group 22 of radio frequency paths 20 for transmission at a first time using a first frequency range and determined radio frequency paths 20 of the second group 24 of radio frequency paths 20 for reception at the first time using a second frequency range that is different to and does not overlap the first frequency range. The first group 22 of radio frequency paths 20 for transmission and the second group 24 of radio frequency paths 20 for reception can fully overlap in time in this FDD mode.

FIGS. 2C and 2D illustrate examples of a full duplex (FD) mode of operation. The transmission allocation (transmission time-frequency tile Tx) and the reception allocation (reception time-frequency tile Rx) are not separated and they overlap—they overlap in frequency and overlap in time. There is simultaneous transmission and reception within the same frequency range. Frequency-time tiles (PRB) are shared for transmission and reception. Separation of transmission and reception channels is via selection of different antenna elements 12 for transmission and reception. In the example of FIG. 2C the overlap in time and frequency is exact. In the example of FIG. 2D the overlap in time and frequency is not exact.

The apparatus 10 in at least some examples comprises controller 50 for enabling full duplex operation of the apparatus 10. Full duplex operation comprises simultaneously using the determined transmission radio frequency paths 20 for transmission in at least a first frequency range and the determined reception radio frequency paths 20 for reception in at least the first frequency range.

During full duplex operation, transmission and reception are simultaneous and different antenna elements 12 are used for transmission and reception. A first set of the first group 22 of radio frequency paths 20 are used as transmission radio frequency paths. A second set of the second group 22 of radio frequency paths 20 are used as reception radio frequency paths.

It will be appreciated that in FIG. 2D the operational mode is full duplex but additionally comprises a partial TDD mode (some but not all allocated resources are time separated with partial frequency overlap) and comprises a partial FDD mode (some but not all allocated resources are frequency separated with partial time overlap)

The controller 50 can in some examples, flexibly operate the apparatus 10 in modes other than or in addition to full duplex, for example, time division duplex mode and/or frequency division duplex mode.

The controller 50 can control switching to and/or from the full duplex mode of operation. In some examples, the switch can be dependent upon a reception quality parameter measured at the apparatus 10.

In particular a switch from the full duplex mode of operation to the time division duplex mode of operation can occur when a reception quality parameter measured at the apparatus falls below a threshold value.

The FD mode does not use all antenna elements 12 for reception, however, the TDD mode uses more, for example all, antenna elements 12 for reception. The TDD mode is therefore expected to have improved gain. The same antenna elements 12 are used for TDD mode of operation and FD mode of operation, however, in FD mode some of the antenna elements 12 are simultaneously used for transmission while others are used for reception, whereas in TDD mode at one time all the antenna elements 12 are simultaneously used for transmission while at another time all the antenna elements 12 are simultaneously used for reception.

The reception quality parameter can, for example, fall below the threshold because of reception gain loss, or increased self-interference (e.g. isolation reduction and/or increased uplink transmit power).

The controller 50 is configured to control switching between a time division duplex mode of operation in which radio frequency paths 20 are not used simultaneously for transmission and reception and a full duplex mode of operation in which there is simultaneous use of the determined transmission radio frequency paths 20 for transmission in at least a first frequency range and the determined reception radio frequency paths 20 for reception in at least the first frequency range.

Figure 3:
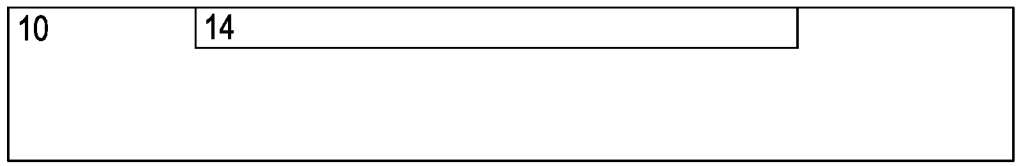
FIG. 3 shows another example of the subject matter described herein.

FIG. 3 illustrates an example of the apparatus 10. The FIG illustrates the array 14 of antenna elements 12.

The array 14 of antenna elements 12 in this and other examples is a single array. The antenna elements are operationally contiguous—the separation distance between nearest neighbor antenna elements 12 within the array 14 is less than the wavelength at the minimum operational frequency of the antenna elements 12 used by the apparatus 10. An antenna array (or array antenna) is a set of multiple connected antennas which work together as a single antenna, to transmit and/or receive radio waves. A first set of elements can be combined as a first sub-array to transmit a first radio wave signal, while a second set of elements can be combined as a second sub-array to simultaneously receive a second radio wave signal.

In some but not necessarily all examples, the array 14 of antenna elements 12 is positioned on a single surface of the apparatus 10 (or an edge of the apparatus 10).

The array 14 of antenna elements 12 can be a one or two-dimensional array 14 of antenna elements 12, for example.

Figure 4A:
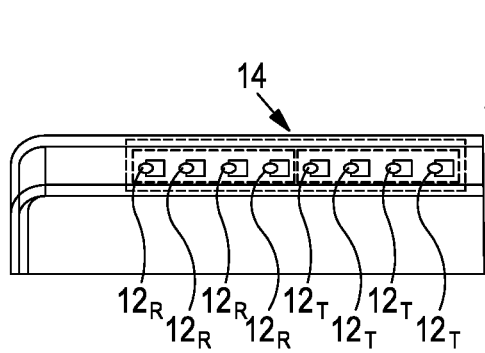
FIG. 4A, 4B show examples of the subject matter described herein.
Figure 4B:
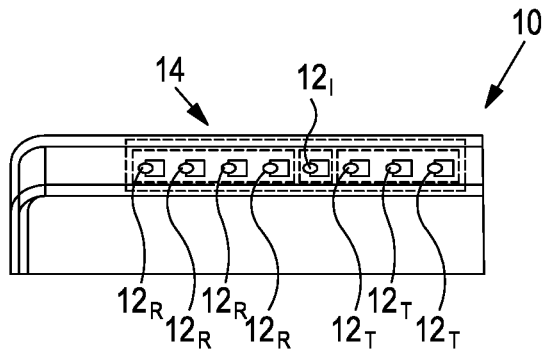

FIGS. 4A and 4B illustrate an example in which the array 14 of antenna elements 12 is a one-dimensional array 14 of antenna elements 12, positioned along a surface/edge/side of a electronic communications device 10 such as a hand-portable apparatus 10. The apparatus can, for example, be a mobile phone, a smartphone, a tablet computer, a laptop, a watch, a wearable device etc.

In FIG. 4A the antenna elements 12 are divided into two categories only—those antenna elements $12_T$ to be used for transmission by transmission radio frequency paths 20 (not illustrated in this FIG) and those antenna elements $12_R$ to be used for reception by reception radio frequency paths 20 (not illustrated in this FIG).

In FIG. 4B the antenna elements 12 are divided into three categories only—those antenna elements $12_T$ to be used for transmission by transmission radio frequency paths 20 (not illustrated in this FIG), those antenna elements $12_R$ to be used for reception by reception radio frequency paths 20 (not illustrated in this FIG), and those antenna elements $12_I$ that are configured for non-use.

The one or more antenna elements $12_I$ configured for non-use physically separate the antenna elements $12_T$ to be used for transmission by transmission radio frequency paths 20, and the antenna elements $12_R$ to be used for reception by reception radio frequency paths 20. This increases isolation between the transmission radio frequency paths 20 and the reception radio frequency paths 20.

In some but not necessarily all examples, the controller 50 (not illustrated in this FIG) is configured to control the radio frequency paths 20 to a set of antenna elements 12 such that each antenna element 12 in the set is configured to transmit $12_T$, configured to receive $12_R$ or configured for non-use $12_I$.

Figure 5A:
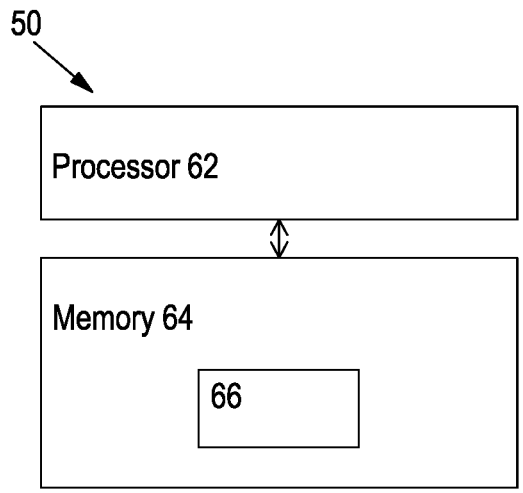
FIG. 5A shows another example of the subject matter described herein.

FIG. 5A illustrates an example of a controller 50. Implementation of a controller 50 may be as controller circuitry. The controller 50 may be implemented in hardware alone, have certain aspects in software including firmware alone or can be a combination of hardware and software (including firmware).

As illustrated in FIG. 5A the controller 50 may be implemented using instructions that enable hardware functionality, for example, by using executable instructions of a computer program 66 in a general-purpose or special-purpose processor 62 that may be stored on a computer readable storage medium (disk, memory etc) to be executed by such a processor 62.

The processor 62 is configured to read from and write to the memory 64. The processor 62 may also comprise an output interface via which data and/or commands are output by the processor 62 and an input interface via which data and/or commands are input to the processor 62.

The memory 64 stores a computer program 66 comprising computer program instructions (computer program code) that controls the operation of the apparatus 10 when loaded into the processor 62. The computer program instructions, of the computer program 66, provide the logic and routines that enables the apparatus to perform the methods illustrated in FIG. 6. The processor 62 by reading the memory 64 is able to load and execute the computer program 66.

The apparatus 10 therefore comprises:
at least one processor 62; and
at least one memory 64 including computer program code 66
the at least one memory 64 and the computer program code 66 configured to, with
the at least one processor 62, cause the apparatus 10 at least to perform:
  determining which of a first group 22 of radio frequency paths 20 for antenna elements 12 of an array 14 of antenna elements 12 are transmission radio frequency paths 20 to be used for transmission and which of a second group 24 of radio frequency paths 20 are reception radio frequency paths 20 to be used for reception; and
  controlling when to use the determined transmission radio frequency paths 20 for transmission and the determined reception radio frequency paths 20 for reception.

Figure 5B:
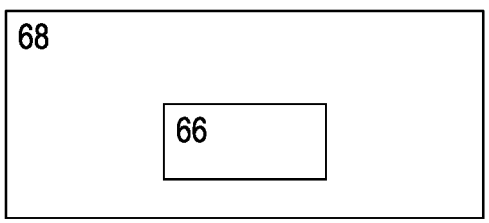
FIG. 5B shows another example of the subject matter described herein.

As illustrated in FIG. 5B, the computer program 66 may arrive at the apparatus 10 via any suitable delivery mechanism 68. The delivery mechanism 68 may be, for example, a machine readable medium, a computer-readable medium, a non-transitory computer-readable storage medium, a computer program product, a memory device, a record medium such as a Compact Disc Read-Only Memory (CD-ROM) or a Digital Versatile Disc (DVD) or a solid state memory, an article of manufacture that comprises or tangibly embodies the computer program 66. The delivery mechanism may be a signal configured to reliably transfer the computer program 66. The apparatus 10 may propagate or transmit the computer program 66 as a computer data signal.

Computer program instructions for causing an apparatus to perform at least the following or for performing at least the following:
  determining which of a first group 22 of radio frequency paths 20 for antenna elements 12 of an array 14 of antenna elements 12 are transmission radio frequency paths 20 to be used for transmission and which of a second group 24 of radio frequency paths 20 are reception radio frequency paths 20 to be used for reception; and
  controlling when to use the determined transmission radio frequency paths 20 for transmission and the determined reception radio frequency paths 20 for reception.

The computer program instructions may be comprised in a computer program, a non-transitory computer readable medium, a computer program product, a machine readable medium. In some but not necessarily all examples, the computer program instructions may be distributed over more than one computer program.

Although the memory 64 is illustrated as a single component/circuitry it may be implemented as one or more separate components/circuitry some or all of which may be integrated/removable and/or may provide permanent/semi-permanent/dynamic/cached storage.

Although the processor 62 is illustrated as a single component/circuitry it may be implemented as one or more separate components/circuitry some or all of which may be integrated/removable. The processor 62 may be a single core or multi-core processor.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' may refer to one or more or all of the following:
  (a) hardware-only circuitry implementations (such as implementations in only analog and/or digital circuitry) and
  (b) combinations of hardware circuits and software, such as (as applicable):
    (i) a combination of analog and/or digital hardware circuit(s) with software/firmware and
    (ii) any portions of hardware processor(s) with software (including digital signal processor(s)), software, and memory(ies) that work together to cause an apparatus, such as a mobile phone or server, to perform various functions and
  (c) hardware circuit(s) and or processor(s), such as a microprocessor(s) or a portion of a microprocessor(s), that requires software (e.g. firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor and its (or their) accompanying software and/or firmware. The term circuitry also covers, for example and if applicable to the particular claim element, a baseband integrated circuit for a mobile device or a similar integrated circuit in a server, a cellular network device, or other computing or network device.

Figure 6:
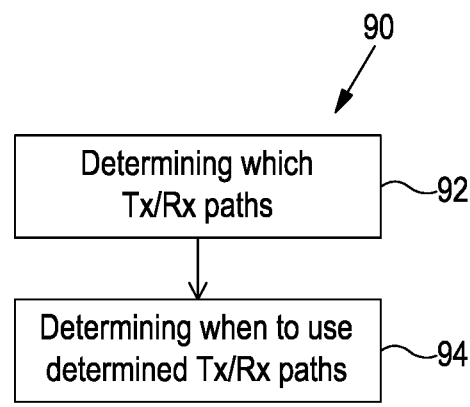
FIG. 6 shows another example of the subject matter described herein.

The blocks illustrated in the FIG. 6 may represent steps in a method and/or sections of code in the computer program 66. The illustration of a particular order to the blocks does not necessarily imply that there is a required or preferred order for the blocks and the order and arrangement of the block may be varied. Furthermore, it may be possible for some blocks to be omitted.

FIG. 6 illustrates an example of a method 90. The method 90 comprises:

at block 92, determining which of a first group 22 of radio frequency paths 20 for antenna elements 12 of an array 14 of antenna elements 12 are transmission radio frequency paths 20 to be used for transmission and which of a second group 24 of radio frequency paths 20 are reception radio frequency paths 20 to be used for reception; and at block 94, controlling when to use the determined transmission radio frequency paths 20 for transmission and the determined reception radio frequency paths 20 for reception.

The method 90 can be augmented as described in the examples provided in this description in relation to the apparatus 10.

The examples illustrated in FIG. 7A, 7B, 8A, 8B are apparatus 10 as previously described.

The apparatus 10 comprise radio frequency paths 20 for antenna elements 12 of an array 14 of antenna elements 12.

A first group 22 of radio frequency paths 20 are suitable for use as transmission radio frequency paths in that each path 20 is capable of interconnecting a respective antenna element 12 with a transmitter 40 (not illustrated in these FIGS). When a radio frequency path 20 is interconnected to the transmitter 40 it is referred to as a transmission radio frequency path $20_T$ rather than a radio frequency path 20.

A second group 24 of radio frequency paths 20 are suitable for use as reception radio frequency paths in that each path 20 is capable of interconnecting a respective antenna element 12 with a receiver 42 (not illustrated in these FIGS). When a radio frequency path 20 is interconnected to the receiver 42 it is referred to as a reception radio frequency path $20_R$ rather than a radio frequency path 20.

The first group 22 of radio frequency paths 20 provides a single transmission radio frequency path $20_T$ to each antenna element 12 in a first set of the antenna elements 12. The second group 24 of radio frequency paths 20 provides a single reception radio frequency path $20_R$ to each antenna element 12 in a second set of the antenna elements 12.

Figure 7A:
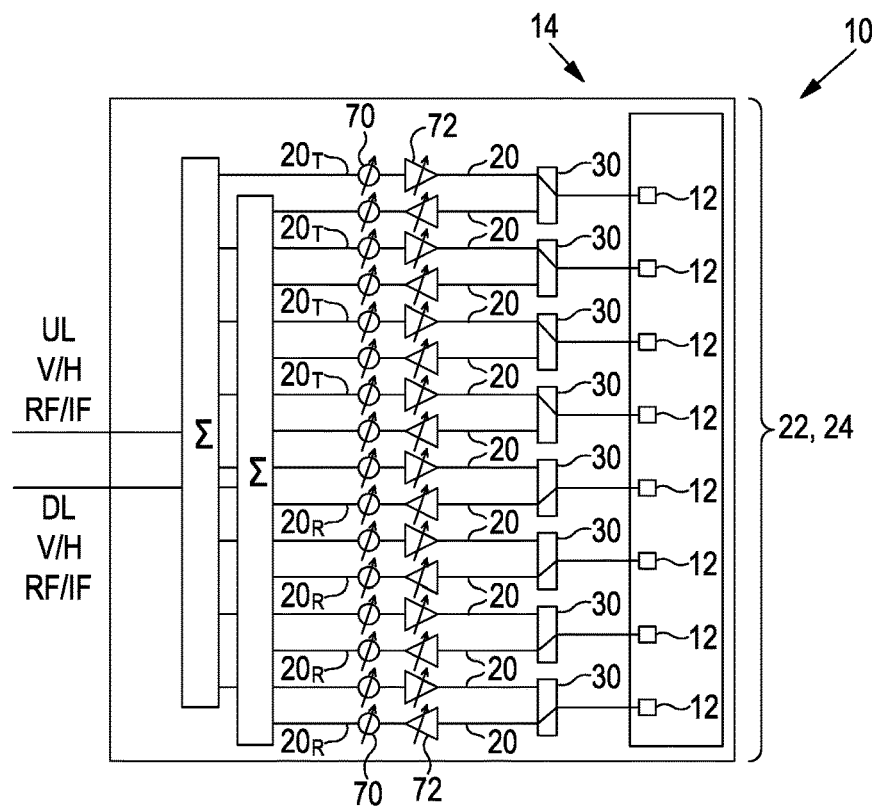
FIG. 7A shows another example of the subject matter described herein.
Figure 7B:
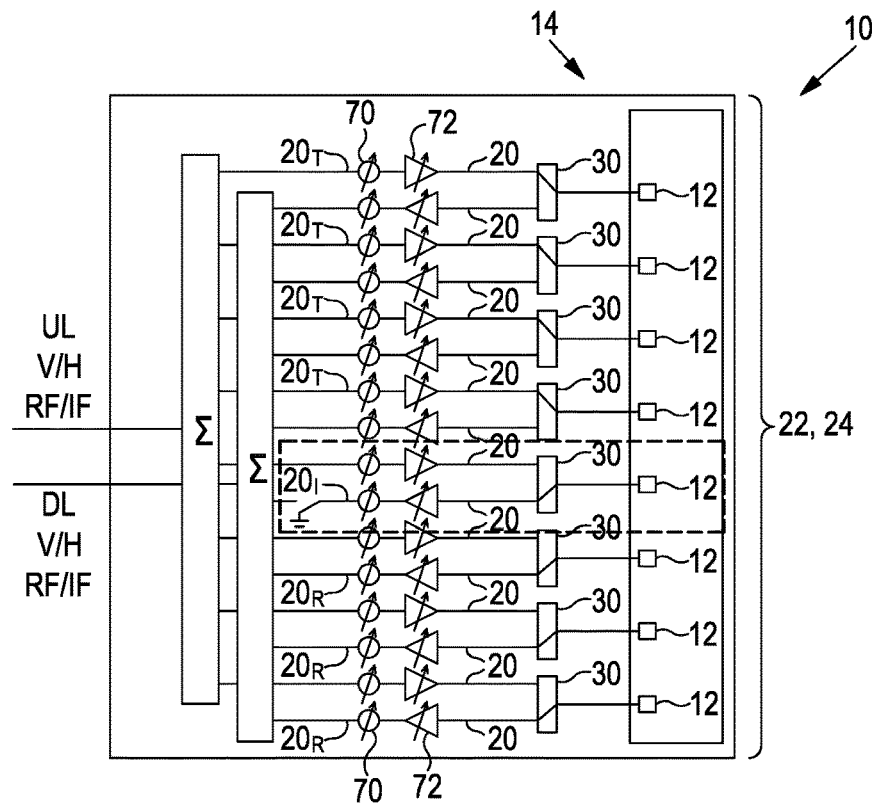
FIG. 7B shows another example of the subject matter described herein.

In the examples of FIGS. 7A and 7B the first group 22 and the second group 24 fully overlap and comprise all the antenna elements 12. The first group 22 and the second group 24 are the same. In other examples the groups 22, 24 could partially overlap. The first set and the second set are non-intersecting sub-sets of the same group 22, 24 of antenna elements 12. The first set is the top four of the eight antenna elements. The second set is the bottom four of the eight antenna elements.

Figure 8A:
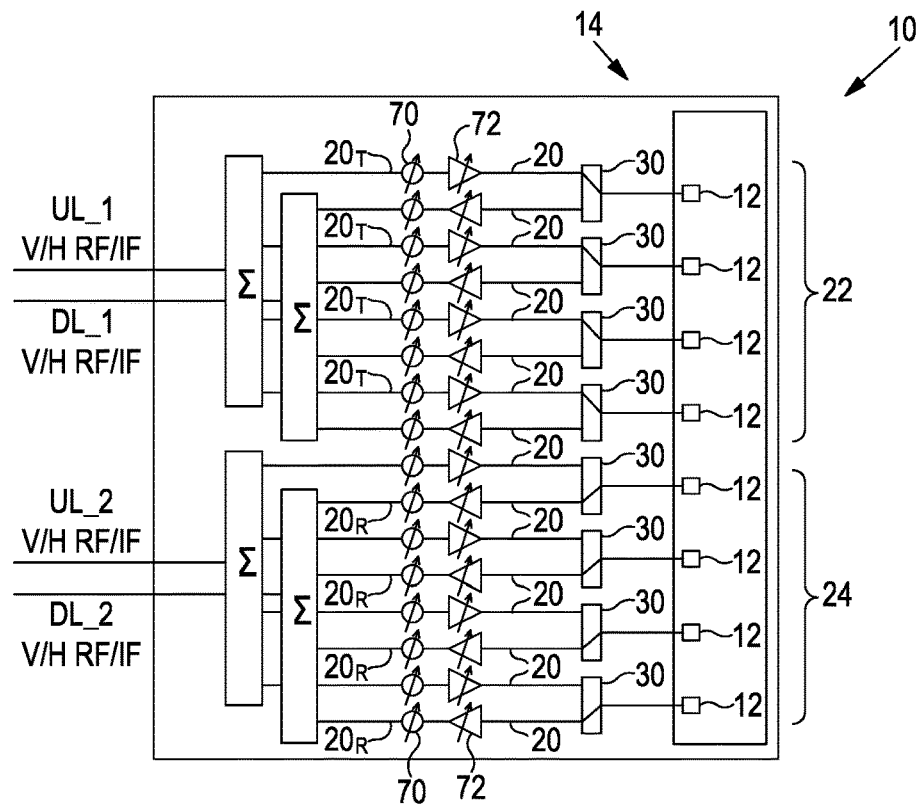
FIG. 8A shows another example of the subject matter described herein.
Figure 8B:
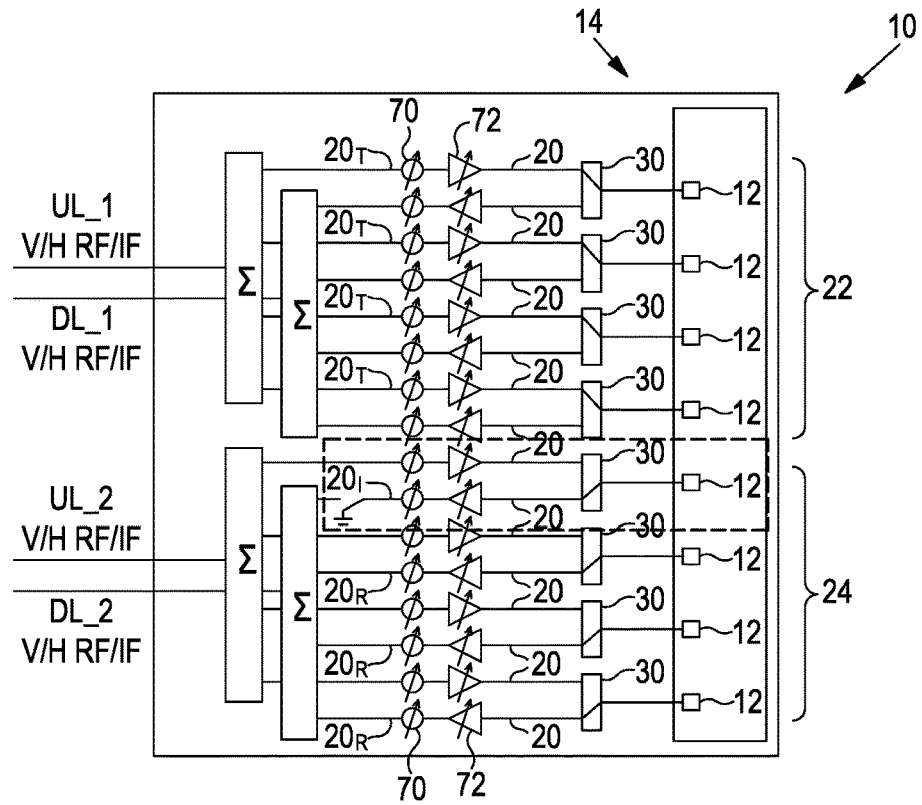
FIG. 8B shows another example of the subject matter described herein.

In the examples of FIGS. 8A and 8B the first group 22 and the second group 24 do not overlap and are distinct. The first group 22 is the top four of the eight antenna elements 12. The second group 24 is the bottom four of the eight antenna elements 12. The first set is the first group 22. The second set is the second group 24.

Each of the antenna elements 12 has a pair of parallel radio frequency paths 20 comprising one radio frequency path 20 for transmission and another radio frequency path 20 for reception.

Each radio frequency path 20 for transmission comprises a controllable phase shifter 70, and also a controllable (transmission) amplifier 72.

Each radio frequency path 20 for reception comprises a controllable phase shifter 70, and also a controllable (reception) amplifier 72.

Each antenna element 12 cannot be simultaneously connected to both the transmitter 40 and the receiver 42 (not illustrated). That is a radio frequency path 20 cannot be both a reception radio frequency path $20_R$ and a transmission radio frequency path $20_T$.

The antenna elements 12 can operate as part of a reception radio frequency path $20_R$ or a transmission radio frequency path $20_T$. Switches 30 can be used to control whether a particular antenna element 12 operates as part of a reception radio frequency path $20_R$ or part of a transmission radio frequency path $20_T$.

Each switch 30 selects between the pair of radio frequency paths 20 associated with an antenna element 12. The collection of switches 30 select the radio frequency paths 20 for transmission to be used as transmission radio frequency paths $20_T$ and the radio frequency paths 20 for reception to be used as a reception radio frequency paths $20_R$.

The apparatus 10 comprises a controller 50 (not illustrated in these FIGS) configured to determine which of the first group 22 of radio frequency paths 20 are transmission radio frequency paths $20_T$ to be used for transmission and which of a second group 24 of radio frequency paths 20 are reception radio frequency paths $20_R$ to be used for reception. The controller 50 provides control signals to the switches 30 which select whether a particular antenna element 12 operates as part of a reception radio frequency path $20_R$ or a transmission radio frequency path $20_T$.

The apparatus controller 50 is also configured to control when to use the determined transmission radio frequency paths $20_T$ for transmission and the determined reception radio frequency paths $20_R$ for reception. This can, for example, be controlled by the timing of the control signals.

In the examples of FIG. 7B, 8B, the controller 50 is configured to provide control signals to the switches 30 which select whether a particular antenna element 12 operates as a reception radio frequency path $20_R$, a transmission radio frequency path $20_T$ or is not used for communication. In some examples, the reception radio frequency paths $20_R$ are separated from transmission radio frequency paths $20_T$ by one or more radio frequency paths $20_I$ that are not in use for transmission or reception.

The illustrated apparatuses 10 therefore comprise:

radio frequency paths 20 for antenna elements 12 of an array 14 of antenna elements 12; and means 50 for: determining which of a first group 22 of radio frequency paths 20 are transmission radio frequency paths 20 to be used for transmission and which of a second group 24 of radio frequency paths 20 are reception radio frequency paths 20 to be used for reception; and controlling when to use the determined transmission radio frequency paths 20 for transmission and the determined reception radio frequency paths 20 for reception.

Figure 9:
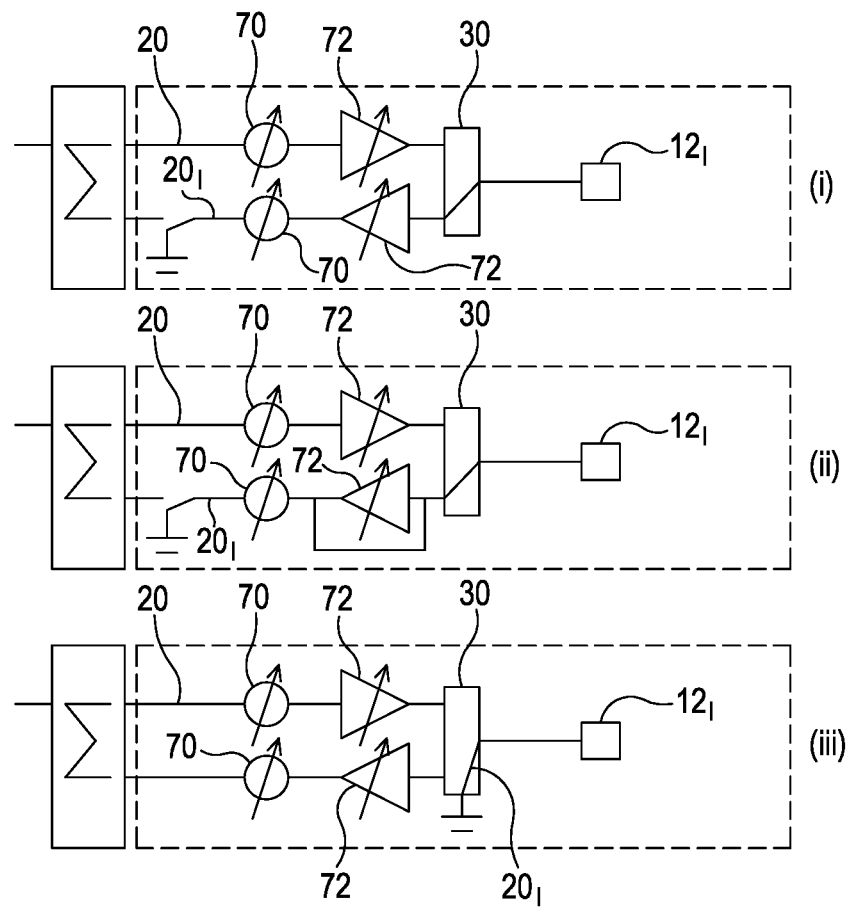
FIG. 9 shows another example of the subject matter described herein.

In the examples of FIG. 9, the controller 50 (not illustrated) is configured to provide control signals to select whether a particular antenna element 12 operates as part of a reception radio frequency path $20_R$, a transmission radio frequency path $20_T$ or an isolated radio frequency path $20_I$ that is not used for communication. The controller 50 is configured to control the radio frequency paths 20 to at least one antenna element 12 such that that the antenna element $12_I$ is configured for non-use. This allows the separation of reception radio frequency paths $20_R$ from transmission radio frequency paths $20_T$ by one or more isolated radio frequency paths $20_I$ that are not in use for transmission or reception.

The controller 50 is configured to control the radio frequency paths 20 to at least one antenna element 12 such that that the antenna element 12 is isolated (configured for non-use) by terminating (connecting) the antenna element 12 via at least one isolated radio frequency path $20_I$ to a known state (for example a fixed impedance such as 50Ω, open circuit or short circuit). The non-used antenna element $12_I$ shown in FIG. 7B, FIG. 8B and FIG. 9 is shown as terminated to ground (short circuit).

The termination of at least one antenna element $12_I$ via an isolated radio frequency path $20_I$, to a known state is either a direct termination (50Ω, open circuit or short circuit) (FIG. 9 III), an indirect termination via the phase shifter 70 (FIG. 9 II), for example, of a radio frequency path 20 for reception, or an indirect termination (FIG. 9 I) via the serially connected phase shifter 70 and amplifier 72 of, for example, the radio frequency path 20 for reception.

Although the indirect termination is via the phase shifter 70 (FIG. 9 II) of the radio frequency path 20 for reception, in other examples, the indirect termination is via the phase shifter 70 of the radio frequency path 20 for transmission The antenna element $12_I$ configured for non-use is isolated, inactive and is not directly driven. It is not used for transmission or reception, In some examples, the controller 50 can be configured to control the radio frequency paths 20 to at least one antenna element 12 such that that the antenna element 12 is configured for non-use by making the antenna element 12 'open circuit' either directly or indirectly. However, this may be less desirable. The termination of the at least one antenna element 12 to a known voltage, for example ground, allows control of reflections.

In some but not necessarily all examples, the controller 50 is configured to control phase shifts applied by the phase shifters 70 in at least some of the radio frequency paths 20T, 20R, 20I for antenna elements 12. The controller 50 can be configured to vary phase shifts in the transmission radio frequency paths 20T to optimize isolation of the individual reception radio frequency paths 20R and then vary phase shifts in the reception radio frequency paths 20R to optimize a combined isolation of the reception radio frequency paths 20R. This is done while keeping a main radiation beam in the required angular direction.

The isolation of the reception radio frequency paths $20_R$ is the transmission power leakage picked up at each reception antenna element 12 compared to the combined transmission power. Isolation is needed to ensure proper linear amplifier operation for all receiving antenna elements 12. This can be measured during user equipment characterisation, when the apparatus 10 is user equipment. This optimization prevents the reception amplifiers 72 running into compression due to transmission power leakage or causing damage.

The combined isolation of the reception radio frequency paths $20_R$ is the combined transmission power leakage picked up at all the receiving antenna elements 12 compared to the combined transmission power. Isolation is needed to ensure proper full duplex operation. This can be measured during user equipment characterisation, when the apparatus 10 is user equipment.

In some but not necessarily all examples, the controller 50 is configured to control phase shifts in at least some of the radio frequency paths 20 for antenna elements 12 to achieve a preferred beam forming direction for transmission and reception. The controller is configured to then control (relative) phase shifts applied by the phase shifters 70 in at least some of the radio frequency paths 20 for antenna elements 12. The controller 50 can be configured to vary phase shifts in the transmission radio frequency paths $20_T$ to optimize isolation of the reception radio frequency paths $20_R$ and then vary phase shifts in the reception radio frequency paths $20_R$ to optimize a combined isolation of the reception radio frequency paths $20_R$.

There can be ranges of different absolute phases for achieving a desired steering direction. It is therefore possible to find phases that achieve the desired steering direction and optimize isolation.

A constraint can be that the steering beam direction and the reception steering beam direction cannot deviate by more than a defined threshold.

For a particular design of apparatus 10, the settings of the phase shifters 70 for different beam steering angles and, optionally, the settings for different FD mode configurations can be stored in memory as a look-up table.

The FD mode configuration is the selection of which radio frequency paths 20 are transmission radio frequency paths $20_T$ and which are reception radio frequency paths $20_R$, and, optionally, which are non-use isolated radio frequency paths $20_I$.

The look-up table can for example associate with each combination of FD mode configuration and beam steering direction, values for identifying the transmission radio frequency paths $20_T$, the reception radio frequency paths $20_R$ and the isolated radio frequency paths $20_I$ (if any) and for identifying the control parameter values for the amplifiers 72 and phase shifters 70 in those paths $20_R$, $20_T$, $20_I$.

Figure 10:
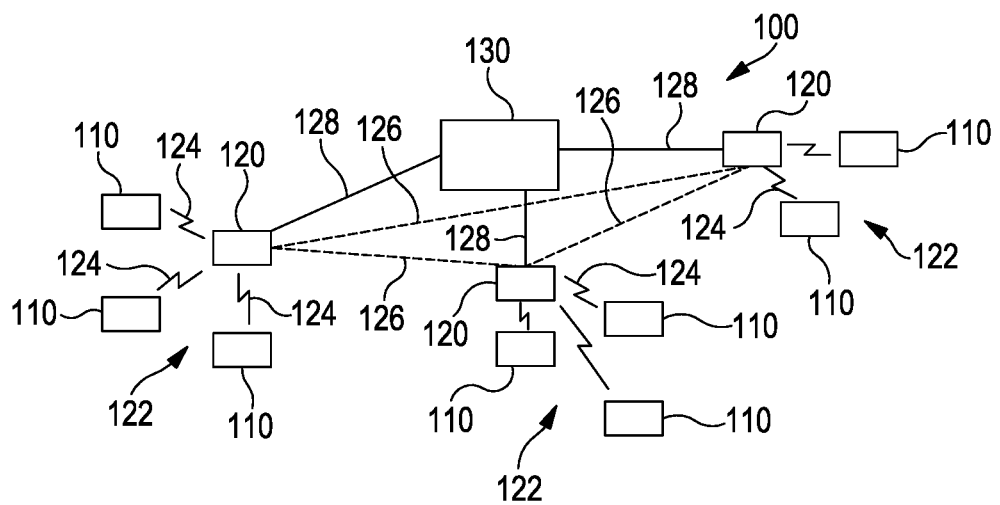
FIG. 10 shows another example of the subject matter described herein.

FIG. 10 illustrates an example of a network 100 comprising a plurality of network nodes including terminal nodes 110, access nodes 120 and one or more core nodes 130. The terminal nodes 110 and access nodes 120 communicate with each other. The one or more core nodes 130 communicate with the access nodes 120.

The one or more core nodes 130 may, in some examples, communicate with each other. The one or more access nodes 120 may, in some examples, communicate with each other.

The network 100 may be a cellular network comprising a plurality of cells 122 each served by an access node 120. In this example, the interface between the terminal nodes 110 and an access node 120 defining a cell 122 is a wireless interface 124.

The access node 120 is a cellular radio transceiver. The terminal nodes 110 are apparatus 10 comprising cellular radio transceivers.

In the example illustrated the cellular network 100 is a third generation Partnership Project (3GPP) network in which the terminal nodes 110 are user equipment (UE) and the access nodes 120 are base stations.

In the particular example illustrated the network 100 is a Universal Terrestrial Radio Access network (UTRAN). The UTRAN consists of UTRAN NodeBs 120, providing the UTRA user plane and control plane (RRC) protocol terminations towards the UE 110. The NodeBs 120 are interconnected with each other by means of an X2 interface 126. and are also connected by means of the S1 interface 128 to the Mobility Management Entity (MME) 130.

The term 'user equipment' is used to designate mobile equipment comprising a smart card for authentication/encryption etc such as a subscriber identity module (SIM).

The NodeB can be any suitable base station. A base station is an access node 120. It can be a network element in radio access network responsible for radio transmission and reception in one or more cells to or from the user equipment.

The UTRAN can be a 3G, 4G or 5G network, for example. It can for example be a New Radio (NR) network that uses gNB as access nodes 120. New Radio (NR) is the 3GPP name for 5G technology. The apparatus 10, 110 can be configured for ultra reliable low latency communication (URLLC) or time sensitive networks (TSN).

The cellular network 100 shown in FIG. 10 could be configured to operate NR in licensed or unlicensed frequency bands.

The system 100 therefore comprises a network node 120 and at least one apparatus 10 that operates as a terminal node 110. The apparatus 10 is a mobile equipment, that operates as user equipment. Transmission by the apparatus 10, 110 is uplink transmission to the network node 120 and reception by the apparatus 10, 110 is downlink reception from the network node 120.

The apparatus 10, 110 and its serving network node 120 have a relative position defined by a beam steering angle.

The system 100 is configured to enable communication between the network node 120 and the apparatus 10, 110 to be used in the determination of the transmission radio frequency paths $20_T$ and the reception radio frequency paths $20_R$ and/or controlling when to use the determined transmission radio frequency paths $20_T$ for transmission and the determined reception radio frequency paths $20_R$ for reception.

The communication between the network node 120 and the apparatus 10, 110 can be used to determine a maximum uplink power for the beam steering angle.

The apparatus 10, 110 is configured to monitor a downlink reception quality parameter, for example, Reference Signal Received Power (RSRP). The downlink reception quality parameter is dependent upon downlink reception gain loss, which depends upon the number of antenna elements 12 used for downlink reception and the beam steering angle. The downlink reception quality parameter is dependent upon uplink transmission interference which is dependent upon isolation and also uplink transmit power. The isolation depends upon the FD mode configuration and also the beam steering angle.

If the reception quality parameter falls below a threshold, for example, a downlink sensitivity limit, then the apparatus 10, 110 can change operation modes to improve reception. The change can for example be a switch to a different FD mode configuration, for example setting one or more radio frequency paths 20/antenna elements 12 to 'non-use' isolated RF paths $20_I$ to improve isolation between the transmission radio frequency paths $20_T$ and the reception radio frequency paths $20_R$. The change can for example be a switch from full duplex mode, to a TDD mode to increase gain and obviate the need for isolation.

The maximum uplink power, for a given beam steering angle is dependent upon a beam steering angle-dependent isolation function, gain loss at the mobile equipment, a downlink sensitivity limit and the uplink power. The uplink power can be controlled to be below a value that, given the isolation, would prevent detection of the downlink signal.

The beam steering angle is determined at the apparatus 10, 110.

The beam steering angle-dependent isolation function, is particular to the apparatus 10, 110 and is preferably stored in the controller 50 of the apparatus 10, 110.

The downlink sensitivity limit is defined as the lowest receive power level at which the DL can still be decoded at a given bit error rate. As such for a given DL scenario the UE will measure e.g. RSRP and when above a given limit conclude that it is not at the sensitivity limit. The limit may be defined local to the UE based on characterisation.

The gain loss at the mobile equipment 10, 110 is, in at least some examples, determined by communication between the network node 120 and the apparatus 10, 110. The network node 120 transmits a reference signal of known power to the apparatus 10, 110. The network node 120 measured the power of the reference signal on reception. The ratio provides the gain loss.

It will be appreciated that although communication between the network node 120 and the apparatus 10, 110 is required to control the maximum uplink power and/or change the operational mode of the apparatus 10, 110, the decision making function can be located in the network node 120, in the apparatus 10, 110 or split between the network node 120 and the apparatus 10, 110.

For example, in some examples, the apparatus 10, 110 reports to the network node 120 a real-time value for gain loss at the apparatus 10, 110, and, in at least some examples a real-time isolation value and a downlink sensitivity limit.

For example, in other examples, the apparatus 10, 110 reports to the network node 120 if the FD mode is or is not possible because of reception gain loss and self-interference, for example, based on whether or not a reception quality parameter falls below a threshold, for example, a downlink sensitivity limit.

The real-time isolation value can, in at least some examples, be determined from a look-up table based on FD mode configuration and beam steering angle.

The use of real-time values enables dynamic adjustment to changes in the reception environment of the apparatus 10, 110. The apparatus 10, 110 can therefore monitor the real-time value for gain loss at the apparatus 10, 110, and, for example, send a report based on the measurement regularly to the network node 120.

When the real-time value for gain loss at the apparatus 10, 110, is good (not gain limited), the network node can command the apparatus 10, 110 to switch to (or to attempt to switch to) FD mode. The apparatus 10, 110 can then select an FD mode configuration. The FD mode configuration can for example depend upon the beam steering angle, transmit power, isolation, reception gain loss and reception sensitivity limit.

The FD mode configuration can be weighted towards gain (not isolation) when a lower uplink transmission power is used. For example, more antenna elements 12 can be used for reception and less or no antenna elements can be configured for non-use isolation.

The FD mode configuration can be weighted towards isolation (not gain) when a higher uplink transmission power is used. For example, less antenna elements 12 can be used for reception and some or more antenna elements 12 can be configured for non-use isolation.

Therefore, the apparatus 10, 110 can in some examples, flexibly switch into or out of the full duplex mode of operation. In some examples, the switch can be dependent upon a reception quality parameter measured at the apparatus.

Figure 11:
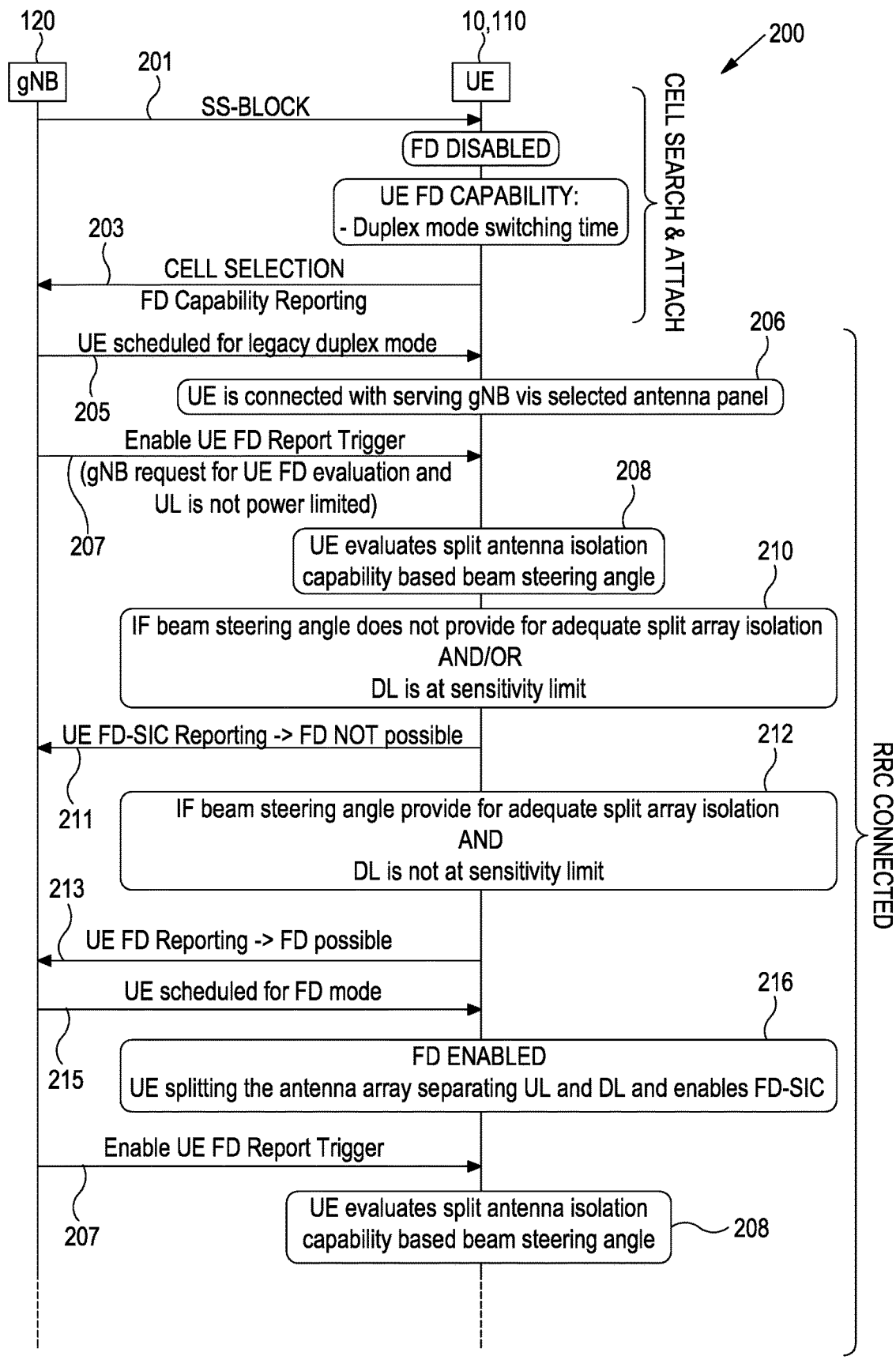
FIG. 11 shows another example of the subject matter described herein.

As illustrated in FIG. 11, the serving network node 120 (gNB) can schedule the apparatus 10, 110 (UE) for split antenna panel FD mode only at steering angles providing for required isolation, when the uplink is not power limited and the downlink is not below the sensitivity limit.

Referring to FIG. 11, initially FD mode has been prevented or is by default not carried out following a command (SS-BLOCK) 201 sent from the network node 120 to the apparatus 10, 110.

The apparatus 10, 110 sends an indication 203 of its FD capability to the network node 120 during cell camping. One option is to include the UE FD capability in the general UE capability reporting. UE capability Information is an RRC message that the UE sends to the Network in most cases during initial access/registration process (i.e. when it is camping onto the cell). It informs on all the details of the UE capabilities. In RRC connected the serving gNB sends a UE capability enquiry and the UE responds with the UE capability information report.

The apparatus 10, 110 is controlled 205 by the network node 120 to enter RRC connected state in TDD mode. The apparatus 10, 110 then uses 206 the array 14 of antenna elements in TDD mode (FIG. 2A).

The network node 120 requests 207 the apparatus 10, 110 to evaluate whether FD mode is possible. Due to the split-antenna gain loss, the network node 120 will not request FD evaluation if it knows that the uplink is power limited.

The apparatus 10, 110 measures 208 a current reception quality parameter e.g. RSRP.

The apparatus 10, 110 can infer than the reception gain loss is insufficient for current beam steering angle (i.e. downlink power below sensitivity limit) when the current reception quality parameter e.g. RSRP falls below a defined lower limit. The sensitivity limit is defined as the lowest receive power level at which the downlink can still be decoded at a given bit error rate.

The apparatus 10, 110 evaluates 208 the isolation of one or more FD mode configurations based on a current beam steering angle. This can, for example, be a memory access by controller 50 to a stored look-up table. The apparatus 10, 110 determines a current isolation based on a pre-determined FD mode look-up table for the current beam steering angle and the current measured reception quality parameter e.g. RSRP.

The apparatus 10, 110 reports 211 to the network node if FD mode is not possible 210, for example:
  (i) if isolation is insufficient for current beam steering angle and uplink transmission power (i.e. uplink is power limited); and/or
  (ii) if reception gain loss is insufficient for current beam steering angle (i.e. downlink power below sensitivity limit; reception quality parameter below a threshold)

The apparatus 10, 110 reports 213 to the network node if FD mode is possible 212, for example:
  (i) if isolation is sufficient for current beam steering angle and uplink transmission power (i.e. uplink is NOT power limited)
  (ii) if reception gain loss is sufficient for current beam steering angle (i.e. downlink power above sensitivity limit)

The network node responds by scheduling 215 the apparatus 10, 110 in FD mode. The apparatus 10, 110, in response to the network node 120, enters FD mode 216 and splits the antenna array 14 according to an FD mode configuration that has sufficient isolation and sufficient reception gain.

The method can then be regularly repeated from the network node requests 207 that request the apparatus 10, 110 to evaluate whether FD mode is possible.

If the FD mode is no longer possible for the apparatus 10, 110 the network node 120 schedules 205, 206 TDD mode operation for the apparatus 10, 110. This could, for example, be in response to receiving at the network node 110 a report 211 that the FD mode is not possible at the apparatus 10, 110. It could also be in response to the network node 120 determining that the uplink is or is likely to be power limited.

Figure 12:
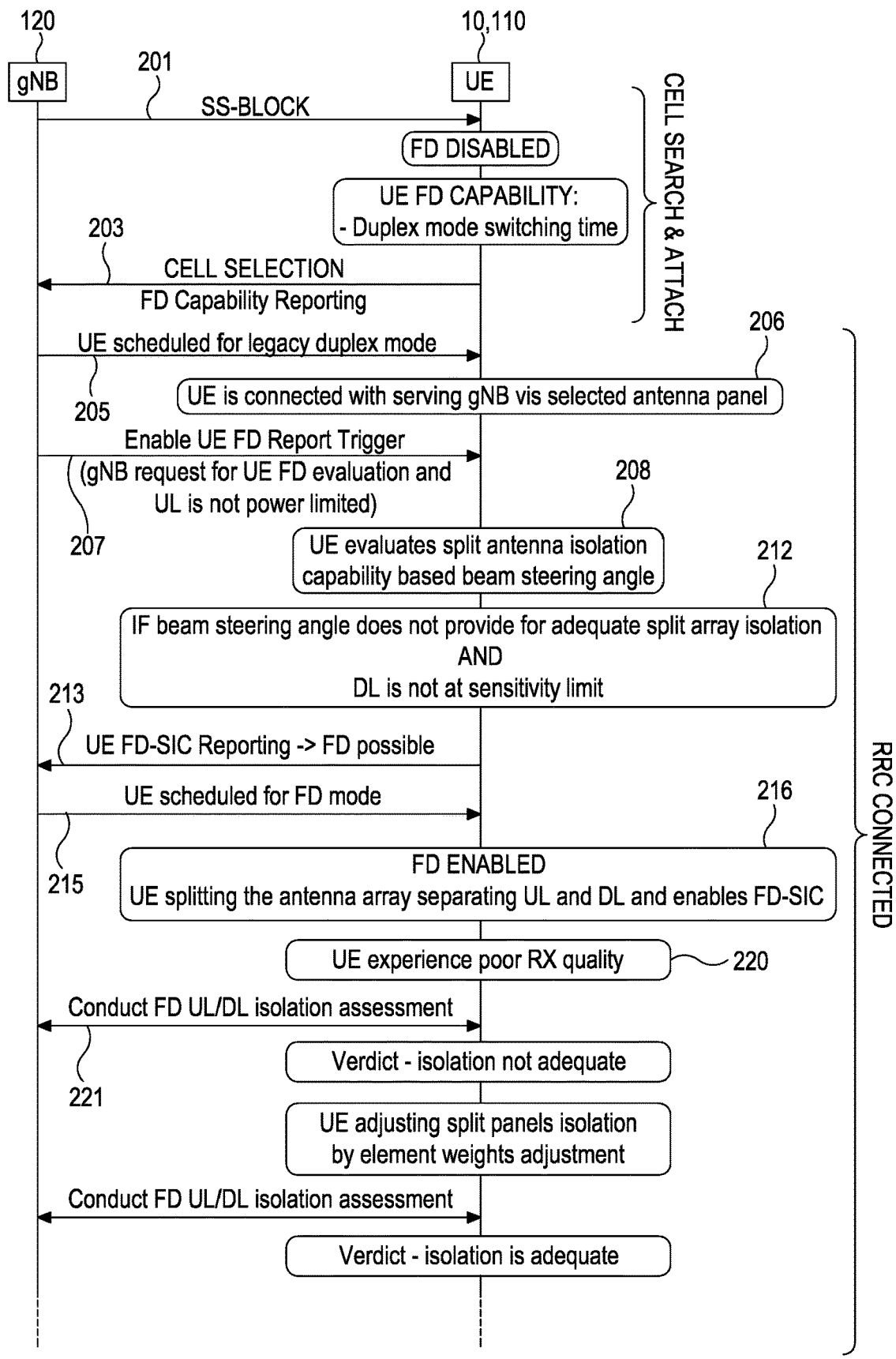
FIG. 12 shows another example of the subject matter described herein.

FIG. 12 is similar to FIG. 11 and similar references are used to reference similar steps, which for brevity will not be re-described here. The method of FIGS. 11 and 12 are the same until after the apparatus 10, 110, in response to the network node 120, enters FD mode 216 and splits the antenna array 14 according to an FD mode configuration that has sufficient isolation and sufficient reception gain.

FIG. 12 illustrates that the FD mode configuration can be dynamic and can be changed to maintain sufficient isolation and sufficient reception gain.

The FD mode configuration can be weighted towards gain (not isolation) when a lower uplink transmission power is used. For example, more antenna elements can be used for reception and less or no antenna elements can be configured for non-use isolation.

The FD mode configuration can be weighted towards isolation (not gain) when a higher uplink transmission power is used. For example, less antenna elements 12 can be used for reception and some or more antenna elements 12 can be configured for non-use isolation.

The different FD mode configurations can be pre-determined and parameters for setting up the different FD mode configuration can be stored in a look-up table. The FD mode configurations can, for example, comprise different entries for different FD mode configurations and beam steering angles, with each entry specifying which antenna elements/RF paths are to be used for transmission and which for reception, and control parameters for phase shifters and amplifiers in the transmission radio frequency paths and the reception radio frequency paths.

In the field, the isolation may be impacted by the environment dynamics etc. and control parameters for phase shifters and amplifiers can be varied to maintain beam steering direction/gain and isolation.

At block 220, the apparatus 10, 110 detects poor reception quality. The apparatus 10, 110 can communicate 221 with the network node 110 to assess reception gain loss.

The gain loss at the mobile equipment 10, 110 is determined by communication 221 between the network node 120 and the apparatus 10, 110. The network node 120 transmits a reference signal of known power to the apparatus 10, 110. The network node 120 measured the power of the reference signal on reception. The ratio provides the gain loss.

The isolation at the mobile equipment 10, 110 is determined by measuring RSRP.

If the isolation is inadequate, it can be improved by maintaining the same FD mode configuration (same split between reception RF paths $20_R$, transmission RF paths $20_T$ and optionally non-use isolating RF paths $20_I$) but changing the control parameters for phase shifters 70 and amplifiers 72 can be varied to maintain beam steering direction/gain and isolation.

Alternatively, If the isolation is inadequate, it can be improved by changing the FD mode configuration (different split between reception RF paths $20_R$, transmission RF paths $20_T$ and optionally non-use isolating RF paths $20_I$).

If the isolation cannot be made adequate, then an appropriate report 211 is sent to the network node 120.

The communication 221 with the network node 120 to assess reception gain loss is optional.

In the figures the interconnection of elements means that they are operationally coupled and any number or combination of intervening elements can exist (including no intervening elements).

Where a structural feature has been described, it may be replaced by means for performing one or more of the functions of the structural feature whether that function or those functions are explicitly or implicitly described.

The data may be stored in processed or unprocessed format remotely at one or more devices. The data may be stored in the Cloud.

The data may be processed remotely at one or more devices. The data may be partially processed locally and partially processed remotely at one or more devices.

The data may be communicated to the remote devices wirelessly via short range radio communications such as Wi-Fi or Bluetooth, for example, or over long range cellular radio links. The apparatus may comprise a communications interface such as, for example, a radio transceiver for communication of data.

The apparatus 110 may be part of the Internet of Things forming part of a larger, distributed network.

The processing of the data, whether local or remote, may be for the purpose of health monitoring, data aggregation, patient monitoring, vital signs monitoring or other purposes.

The processing of the data, whether local or remote, may involve artificial intelligence or machine learning algorithms. The data may, for example, be used as learning input to train a machine learning network or may be used as a query input to a machine learning network, which provides a response. The machine learning network may for example use linear regression, logistic regression, vector support machines or an acyclic machine learning network such as a single or multi hidden layer neural network.

The processing of the data, whether local or remote, may produce an output. The output may be communicated to the apparatus 10 where it may produce an output sensible to the subject such as an audio output, visual output or haptic output.

The recording of data may comprise only temporary recording, or it may comprise permanent recording or it may comprise both temporary recording and permanent recording, Temporary recording implies the recording of data temporarily. This may, for example, occur during sensing or image capture, occur at a dynamic memory, occur at a buffer such as a circular buffer, a register, a cache or similar. Permanent recording implies that the data is in the form of an addressable data structure that is retrievable from an addressable memory space and can therefore be stored and retrieved until deleted or over-written, although long-term storage may or may not occur. The use of the term 'store' in relation to data relates to permanent recording of the data of the image.

An operational resonant mode (operational bandwidth) is a frequency range over which an antenna element 12 can efficiently operate. An operational resonant mode (operational bandwidth) may be defined as where the return loss S11 of the antenna element 12 is greater than an operational threshold T such as, for example, −6 or −10 dB. The antenna elements 12 can be configured to operate with the same operational bandwidths.

As used here 'module' refers to a unit or apparatus that excludes certain parts/components that would be added by an end manufacturer or a user. The apparatus 10 can be a module.

The above described examples find application as enabling components of: automotive systems; telecommunication systems; electronic systems including consumer electronic products; distributed computing systems; media systems for generating or rendering media content including audio, visual and audio visual content and mixed, mediated, virtual and/or augmented reality; personal systems including personal health systems or personal fitness systems; navigation systems; user interfaces also known as human machine interfaces; networks including cellular, non-cellular, and optical networks; ad-hoc networks; the internet; the internet of things; virtualized networks; and related software and services.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one." or by using "consisting".

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although examples have been described in the preceding paragraphs with reference to various examples, it should be appreciated that modifications to the examples given can be made without departing from the scope of the claims.

Features described in the preceding description may be used in combinations other than the combinations explicitly described above.

Although functions have been described with reference to certain features, those functions may be performable by other features whether described or not.

Although features have been described with reference to certain examples, those features may also be present in other examples whether described or not.

The term 'a' or 'the' is used in this document with an inclusive not an exclusive meaning. That is any reference to X comprising a/the Y indicates that X may comprise only one Y or may comprise more than one Y unless the context clearly indicates the contrary. If it is intended to use 'a' or 'the' with an exclusive meaning then it will be made clear in the context. In some circumstances the use of 'at least one' or 'one or more' may be used to emphasis an inclusive meaning but the absence of these terms should not be taken to infer any exclusive meaning.

The presence of a feature (or combination of features) in a claim is a reference to that feature or (combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

Whilst endeavoring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

We claim:

1. An apparatus comprising:
   at least one processor; and
   at least one memory storing instructions that, when executed by the at least one processor, cause the apparatus at least to:
   determine which of a first group of radio frequency paths for antenna elements of an array of antenna elements are transmission radio frequency paths to be used for transmission and which of a second group of radio frequency paths for the antenna elements of the array of antenna elements are reception radio frequency paths to be used for reception, wherein the second group comprises at least one or more radio frequency paths that are different from the first group of radio frequency paths, wherein the array of antenna elements comprises a one or two-dimensional array of the antenna elements that is positioned on a single surface or a single edge of the apparatus, and wherein a transmission steering beam direction and a reception steering beam direction of the array are configured to not deviate by more than a threshold; and
   control when to use the determined transmission radio frequency paths for transmission and the determined reception radio frequency paths for reception.

2. An apparatus as claimed in claim 1 wherein the instructions, when executed by the at least one processor, further cause the apparatus to enable full duplex operation of the apparatus by simultaneously using the determined transmission radio frequency paths for transmission in at least a first frequency range and the determined reception radio frequency paths for reception in at least the first frequency range.

3. An apparatus as claimed in claim 1 further comprising a switch for switching between a time division duplex mode of operation in which radio frequency paths are not used simultaneously for transmission and reception and a full duplex mode of operation in which there is simultaneous use of the determined transmission radio frequency paths for transmission in at least a first frequency range and the determined reception radio frequency paths for reception in at least the first frequency range.

4. An apparatus as claimed in claim 1, wherein each of at least a first plurality of the antenna elements have a pair of parallel radio frequency paths comprising one radio frequency path for transmission and another radio frequency path for reception.

5. An apparatus as claimed in claim 4, further comprising at least one first switch for selecting one or more of the radio frequency paths for transmission to be used as transmission radio frequency paths and at least one second switch for selecting one or more of the radio frequency paths for reception to be used as reception radio frequency paths.

6. An apparatus as claimed in claim 4 wherein each radio frequency path for transmission and each radio frequency path for reception has a separate phase shifter.

7. An apparatus as claimed in claim 1, wherein the first group of radio frequency paths provides a single radio frequency path, for transmission, to each antenna element in a first sub-set of the antenna elements and wherein the second group of radio frequency paths provides a single radio frequency path, for reception, to each antenna element in a second sub-set of the antenna elements, wherein the first sub-set and the second sub-set fully or partially overlap.

8. An apparatus as claimed in claim 1, wherein the first group of radio frequency paths provides a single radio frequency path, for transmission, to each antenna element in a first sub-set of the antenna elements and wherein the second group of radio frequency paths provides a single radio frequency path, for reception, to each antenna element in a second sub-set of the antenna elements, wherein the first sub-set and the second sub-set do not overlap.

9. An apparatus as claimed in claim 1 wherein the instructions, when executed by the at least one processor, further cause the apparatus to control the radio frequency paths to each antenna element such that each antenna element is configured to transmit, configured to receive or configured for non-use.

10. An apparatus as claimed in claim 9, wherein the instructions, when executed by the at least one processor, further cause the apparatus to control the radio frequency paths to each antenna element by terminating at least one radio frequency path for reception at a known state.

11. An apparatus as claimed in claim 10, wherein termination of the at least one radio frequency path for reception at a known state is either a direct termination, an indirect termination via a phase shifter, or an indirect termination via a serially connected phase shifter and amplifier.

12. An apparatus as claimed in claim 1 wherein the instructions, when executed by the at least one processor, further cause the apparatus to control phase shifts in at least some of the radio frequency paths for antenna elements; to optimize phase shifts in the transmission radio frequency paths to optimize isolation of the reception radio frequency paths; and to optimize phase shifts in the reception radio frequency paths to optimize a combined isolation of the reception radio frequency paths.

13. An apparatus as claimed in claim 1 wherein the instructions, when executed by the at least one processor, further cause the apparatus to control phase shifts in at least some of the radio frequency paths for antenna elements to achieve a preferred beam forming direction; to optimize phase shifts in the transmission radio frequency paths to optimize isolation of the reception radio frequency paths; and to optimize phase shifts in the reception radio frequency paths to optimize a combined isolation of the reception radio frequency paths.

14. A portable electronic device comprising the apparatus of claim 1.

15. A method comprising:
    determining which of a first group of radio frequency paths for antenna elements of an array of antenna elements are transmission radio frequency paths to be used for transmission and which of a second group of radio frequency paths for the antenna elements of the array of antenna elements are reception radio frequency paths to be used for reception, wherein the second group comprises at least one or more radio frequency paths that are different from the first group of radio frequency paths, wherein the array of antenna elements comprises a one or two-dimensional array of the antenna elements that is positioned on a single surface or a single edge of the apparatus, and wherein a transmission steering beam direction and a reception steering beam direction of the array are configured to not deviate by more than a threshold; and controlling when to use the determined transmission radio frequency paths for transmission and the determined reception radio frequency paths for reception.

16. A non-transitory computer readable medium storing a computer program that, when run on a computer, performs:

determining which of a first group of radio frequency paths for antenna elements of an array of antenna elements are transmission radio frequency paths to be used for transmission and which of a second group of radio frequency paths for the antenna elements of the array of antenna elements are reception radio frequency paths to be used for reception, wherein the second group comprises at least one or more radio frequency paths that are different from the first group of radio frequency paths, wherein the array of antenna elements comprises a one or two-dimensional array of the antenna elements that is positioned on a single surface or a single edge of the apparatus, and wherein a transmission steering beam direction and a reception steering beam direction of the array are configured to not deviate by more than a threshold; and controlling when to use the determined transmission radio frequency paths for transmission and the determined reception radio frequency paths for reception.

17. A method as claimed in claim 15 further comprising enabling full duplex operation by simultaneously using the determined transmission radio frequency paths for transmission in at least a first frequency range and the determined reception radio frequency paths for reception in at least the first frequency range.

18. A method as claimed in claim 15 further comprising switching between a time division duplex mode of operation in which radio frequency paths are not used simultaneously for transmission and reception and a full duplex mode of operation in which there is simultaneous use of the determined transmission radio frequency paths for transmission in at least a first frequency range and the determined reception radio frequency paths for reception in at least the first frequency range.

19. A method as claimed in claim 15 further comprising controlling the radio frequency paths to each antenna element such that each antenna element is configured to transmit, configured to receive or configured for non-use.

* * * * *